(12) United States Patent
Kosaka et al.

(10) Patent No.: US 7,772,322 B2
(45) Date of Patent: *Aug. 10, 2010

(54) POLY(ARYLENE ETHER) COMPOSITION AND ARTICLES

(75) Inventors: Kazunari Kosaka, Mibu-Machi (JP); Xiucuo Li, Shanghai (CN); Weiguang Yao, Moka (JP)

(73) Assignee: Sabic Innovative Plastics IP B.V. (NL)

( * ) Notice: Subject to any disclaimer, the term of this patent is extended or adjusted under 35 U.S.C. 154(b) by 156 days.

This patent is subject to a terminal disclaimer.

(21) Appl. No.: 11/060,196

(22) Filed: Feb. 17, 2005

(65) Prior Publication Data

US 2006/0182967 A1  Aug. 17, 2006

(51) Int. Cl.
C08L 53/02 (2006.01)
C08L 71/12 (2006.01)

(52) U.S. Cl. .......................... 525/88; 525/92 D; 525/89

(58) Field of Classification Search .................. 525/88, 525/92 D, 89
See application file for complete search history.

(56) References Cited

U.S. PATENT DOCUMENTS

| | | | |
|---|---|---|---|
| 4,166,055 A | 8/1979 | Lee | 524/141 |
| 4,239,673 A | 12/1980 | Lee | 524/141 |
| 4,383,082 A | 5/1983 | Lee | 525/92 D |
| 4,578,429 A | 3/1986 | Gergen et al. | 525/291 |
| 4,760,118 A | 7/1988 | White et al. | 525/397 |
| 4,868,914 A | 9/1989 | Yamashita | 340/5.24 |
| 4,882,384 A | 11/1989 | Willis et al. | 525/105 |
| 4,970,265 A | 11/1990 | Willis | 525/332.9 |
| 5,166,264 A | 11/1992 | Lee | 525/92 D |
| 5,206,300 A | 4/1993 | Chamberlain | 525/314 |
| 5,262,480 A | 11/1993 | Lee | 525/92 D |
| 5,276,101 A | 1/1994 | Chamberlain et al. | 525/314 |
| 5,397,822 A | 3/1995 | Lee | 524/127 |
| 5,516,831 A | 5/1996 | Pottick et al. | 524/474 |
| 6,045,883 A | 4/2000 | Aklyama et al. | 428/35.7 |
| 6,306,978 B1 | 10/2001 | Braat et al. | 525/397 |
| 6,610,422 B1 | 8/2003 | Ooi et al. | 428/653 |
| 2003/0166776 A1* | 9/2003 | Wright et al. | 525/88 |
| 2003/0176582 A1 | 9/2003 | Bening et al. | 525/242 |
| 2003/0181584 A1* | 9/2003 | Handlin et al. | 525/88 |
| 2004/0146541 A1* | 7/2004 | Chen | 424/405 |
| 2005/0106982 A1* | 5/2005 | Berrigan et al. | 442/415 |
| 2005/0137346 A1 | 6/2005 | Bening et al. | 525/314 |
| 2005/0137347 A1 | 6/2005 | Bening et al. | 525/314 |
| 2005/0137348 A1 | 6/2005 | Bening et al. | 525/314 |
| 2005/0137349 A1 | 6/2005 | Bening et al. | 525/314 |
| 2005/0137350 A1 | 6/2005 | Bening et al. | 525/314 |
| 2005/0171290 A1 | 8/2005 | Bening et al. | 525/314 |
| 2005/0285086 A1* | 12/2005 | Kosaka et al. | 252/609 |
| 2005/0288402 A1* | 12/2005 | Kosaka et al. | 524/90 |
| 2006/0106139 A1* | 5/2006 | Kosaka et al. | 524/90 |
| 2006/0131050 A1* | 6/2006 | Mhetar et al. | 174/110 R |
| 2006/0131051 A1* | 6/2006 | Mhetar et al. | 174/110 R |
| 2006/0131052 A1* | 6/2006 | Mhetar et al. | 174/110 R |
| 2006/0131053 A1* | 6/2006 | Kubo et al. | 174/110 R |
| 2006/0131059 A1* | 6/2006 | Xu et al. | 174/117 F |
| 2006/0135661 A1* | 6/2006 | Mhetar et al. | 524/127 |
| 2006/0135695 A1* | 6/2006 | Guo et al. | 525/92 D |
| 2007/0185265 A1* | 8/2007 | Rogunova et al. | 525/88 |

FOREIGN PATENT DOCUMENTS

| | | |
|---|---|---|
| EP | 0413972 | 2/1991 |
| EP | 0467113 | 1/1992 |
| EP | 0639620 | 2/1995 |
| EP | 0362660 | 4/1995 |

OTHER PUBLICATIONS

Japanese Patent No. JP3220231 published Oct. 22, 2001, manual translation.
Japanese Patent No. JP3267146 published Mar. 18, 2002, manual translation.
Japanese Patent No. JP3418209 published Jun. 16, 2003, manual translation.
Japanese Patent No. JP3457042 published Oct. 14, 2003, manual translation.
Japanese Patent No. JP07-224193 published Aug. 22, 1995, machine translation.
Japanese Patent No. JP11-185532 published Jul. 9, 1999, machine translation.
Japanese Patent No. JP2003-253066 published Sep. 10, 2003, machine translation.
UL 62 "Flexible Cord and Fixture Wire" 134 pgs. Flexible Cord and Fixture Wire 134 pgs.
UL 94 "Tests for Flammability of Plastic Materials for Parts in Devices and Appliances" 52pgs.
UL 1581 "Reference Standard for Electrical Wires, Cables, and Flexible Cords" 214 pgs.
ASTM D638 "Standard Test Method for Tensile Properties of Plastics" 15pgs.
ASTM D648 "Standard Test Method for Deflection Temperature of Plastics Under Flexural Load in the Edgewise Position"12pgs.
ASTM D790 "Standard Test Methods for Flexural Properties of Unreinforced and Reinforced Plastics and Electrical Insulating Materials" 11pgs.
ASTM D2240 "Standard Test Method for Rubber Property-Durometer Hardness" 12pgs.
International Search Report for International Application No. PCT/US2006/0044223, International Filing Date Sep. 2, 2006, Date of Mailing Jun. 26, 2006, 6 pages.

* cited by examiner

Primary Examiner—Jeffrey C Mullis
(74) Attorney, Agent, or Firm—Cantor Colburn LLP

(57) ABSTRACT

A flexible thermoplastic composition comprises a poly (arylene ether), a first block copolymer, a second block copolymer and a flame retardant wherein the second block copolymer comprises a controlled distribution copolymer block. The flexible thermoplastic composition is useful in the manufacture of coated wires.

50 Claims, No Drawings

POLY(ARYLENE ETHER) COMPOSITION AND ARTICLES

BACKGROUND OF INVENTION

This disclosure relates to flexible thermoplastic compositions. In particular, the disclosure relates to flexible poly (arylene ether) compositions.

Polyvinyl chloride resins have long been used as the coating resin in the coated wire and cable industry. However, there is mounting concern over the environmental impact of halogenated materials and non-halogenated alternatives are being sought. This search has met with some success in polyethylene compositions however useful polyethylene compositions typically have high levels of inorganic flame retardants that can result in deterioration of some mechanical properties and processability.

Additionally, as electronic devices become increasingly smaller and transportable there is an increasing need for the cables and wires employed as part of accessories for these devices to be more flexible and durable. Flexibility and durability can be difficult to achieve, particularly in harsh environments.

Accordingly, there is a need for a flexible thermoplastic composition with excellent mechanical properties and processability, which is important to the durability and cost effectiveness of coated wires and cables made using the flexible thermoplastic composition.

BRIEF DESCRIPTION OF THE INVENTION

Disclosed herein is a flexible thermoplastic composition comprising a poly(arylene ether), a first block copolymer, a second block copolymer and a flame retardant wherein the second block copolymer comprises a controlled distribution copolymer block having terminal regions that are rich in alkylene units and a center region that is rich in aryl alkylene units.

Also disclosed herein is a coated wire comprising an electrically conductive core at least partially covered by a flexible thermoplastic composition comprising a poly(arylene ether), a first block copolymer, a second block copolymer and a flame retardant wherein the second block copolymer comprises a controlled distribution copolymer block having terminal regions that are rich in alkylene units and a center region that is rich in aryl alkylene units.

DETAILED DESCRIPTION

The flexible thermoplastic composition has a surprising combination of dielectric strength, flexibility, mechanical performance, heat resistance and flame retardance. This combination of physical properties makes the flexible thermoplastic composition useful for an electrically insulating coating on a conductive core.

The flexible thermoplastic composition has a tensile strength greater than or equal to 10 Megapascals (Mpa), and an ultimate elongation greater than or equal to 100%, according to UL 1581. The tensile strength can be greater than or equal to 12 MPa, or, more specifically, greater than or equal to 15 MPa. The tensile strength can be less than or equal to 35 Mpa. The ultimate elongation can be greater than or equal to 120%, or, more specifically, greater than or equal to 150%. The ultimate elongation can be less than or equal to 500%.

In addition a coated wire comprising the flexible thermoplastic composition meets or exceeds the VW-1 flame test according to UL 1581.

Additionally the flexible thermoplastic composition has a heat deformation less than or equal to 50% at 121° C. with a weight of 250 grams as determined by UL 62.

The flexible thermoplastic composition can have a flame retardance of V-1 or better according to Underwriter's Laboratory Bulletin 94 entitled "Tests for Flammability of Plastic Materials, UL94" (UL94) at a thickness of 6.4 millimeters (mm). The flexible composition can have a flame retardance of V-0 according to UL94 at a thickness of 6.4 mm.

The flexible thermoplastic composition has a tensile strength greater than or equal to 10 Megapascals (Mpa), or, more specifically, greater than or equal to 12 MPa, or, even more specifically, greater than or equal to 13 MPa. The tensile strength can be less than or equal to 35 Mpa. The flexible thermoplastic composition has a tensile elongation greater than or equal to 100%, or, more specifically, greater than or equal to 110%, or, even more specifically, greater than or equal to 120%. The tensile elongation can be less than or equal to 500%. Tensile strength and tensile elongation (as used in this paragraph) can be determined according to a modified version of ASTM D638 wherein testing is carried out on a Type I specimen at a speed of 10 millimeters per minute and the elongation gage is 115 millimeters and the tensile elongation is calculated by measuring the elongation of the gage, dividing by 50 millimeters and converting to percent. The relationship between the tensile elongation obtained by the modified version of ASTM D638 and the tensile elongation obtained by ASTM D638 is: ASTM D638 value=modified ASTM D638 value X 0.55. The relationship between the tensile strength obtained by the modified version of ASTM D638 and the tensile strength obtained by ASTM D638 is: ASTM D638 value=modified ASTM D638 value X 0.96.

The flexible thermoplastic composition can have a heat distortion temperature (HDT) greater than or equal to 70° C., or more specifically, greater than or equal to 75° C., or, even more specifically, greater than or equal to 80° C., at 4.6 kilograms per square centimeter (kg/cm$^2$) grams as determined according to ASTM D648. The heat distortion temperature can be less than or equal to 100° C.

The flexible thermoplastic composition has a Shore D value of 40 to 70 as determined according to ASTM D2240. Within this range the Shore D value can be greater than or equal to 45, or, more specifically, greater than or equal to 50. Also within this range the Shore D value can be less than or equal to 65, or, more specifically, less than or equal to 60.

The flexible thermoplastic composition exhibits excellent heat aging properties. When a sample having a thickness of 0.03 to 0.3 millimeters (mm) is maintained at 136° C. for 168 hours the composition has a tensile elongation, as determined by UL 1581, which is greater than or equal to 50% of the tensile elongation value before heat aging. In some embodiments after heat aging the composition has a tensile elongation greater than or equal to 55% of the tensile elongation value before heat aging. After heat aging the composition can have a tensile elongation less than or equal to 100% of the tensile elongation value before heat aging.

The composition is essentially free of chlorine, bromine and fluorine. Essentially free is defined herein as containing less than or equal to 0.1 weight percent, or, more specifically, less than or equal to 0.05 weight percent, or, even more specifically, less than or equal to 0.01 weight percent of chlorine, bromine, fluorine or combinations thereof, based on the total weight of the composition. Halogen content can be determined by DIN EN 14582, method B.

The composition can have a flexural modulus of 350 to 1000 Mpa as determined by ASTM D790. Within this range the flexural modulus can be greater than or equal to 375, or, more specifically, greater than or equal to 400 Mpa. Also within this range the flexural modulus can be less than or equal to 950, or, more specifically, less than or equal to 900 Mpa.

As used herein, a "poly(arylene ether)" comprises a plurality of structural units of the formula (I):

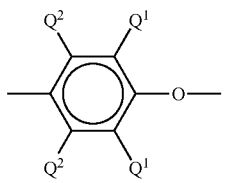

wherein for each structural unit, each $Q^1$ and $Q^2$ is independently hydrogen, primary or secondary lower alkyl (e.g., an alkyl containing 1 to about 7 carbon atoms), phenyl, haloalkyl, aminoalkyl, alkenylalkyl, alkynylalkyl, hydrocarbonoxy, and aryl. In some embodiments, each $Q^1$ is independently alkyl or phenyl, for example, $C_{1-4}$ alkyl, and each $Q^2$ is independently hydrogen or methyl. The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether containing 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In one embodiment, the poly(arylene ether) comprises a capped poly(arylene ether). The capping can be used to reduce the oxidation of terminal hydroxy groups on the poly (arylene ether) chain. The terminal hydroxy groups can be inactivated by capping with an inactivating capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) can be capped to any desirable extent up to 80 percent, more specifically up to about 90 percent, and even more specifically up to 100 percent of the hydroxy groups are capped. Suitable capped poly (arylene ether) and their preparation are described in U.S. Pat. Nos. 4,760,118 to White et al. and 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which can in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine (salicylamide). The removal of the amino group and the capping provides a poly(arylene ether) that is more stable to high temperatures, thereby resulting in fewer degradative products, such as gels or black specks, during processing of the poly(arylene ether).

The poly(arylene ether) can be functionalized with a poly-functional compound such as a polycarboxylic acid or those compounds having in the molecule both (a) a carbon-carbon double bond or a carbon-carbon triple bond and b) at least one carboxylic acid, anhydride, amide, ester, imide, amino, epoxy, orthoester, or hydroxy group. Examples of such poly-functional compounds include maleic acid, maleic anhydride, fumaric acid, and citric acid.

The poly(arylene ether) can have a number average molecular weight of about 3,000 to about 40,000 grams per mole (g/mol) and a weight average molecular weight of about 5,000 to about 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s can have an initial intrinsic viscosity greater than 0.3 deciliters per gram (dl/g), as measured in chloroform at 25° C. Initial intrinsic viscosity is defined as the intrinsic viscosity of the poly(arylene ether) after isolation from the reaction solution and prior to melt processing. As understood by one of ordinary skill in the art the viscosity of the poly(arylene ether) can be up to 30% higher after melt processing. The percentage of increase can be calculated by (final intrinsic viscosity−initial intrinsic viscosity)/initial intrinsic viscosity. Determining an exact ratio, when two intrinsic viscosities are used, will depend somewhat on the exact intrinsic viscosities of the poly(arylene ether) used and the ultimate physical properties that are desired.

The poly(arylene ether) can have a hydroxy end group content of less than or equal to 6300 parts per million based on the total weight of the poly(arylene ether) (ppm) as determined by Fourier Transform Infrared Spectrometry (FTIR). In one embodiment the poly(arylene ether) can have a hydroxy end group content of less than or equal to 3000 ppm, or, more specifically, less than or equal to 1500 ppm, or, even more specifically, less than or equal to 500 ppm.

The poly(arylene ether) can be substantially free of visible particulate impurities. In one embodiment, the poly(arylene ether) is substantially free of particulate impurities greater than about 15 micrometers. As used herein, the term "substantially free of visible particulate impurities" means that a ten gram sample of the poly(arylene ether) dissolved in fifty milliliters of chloroform ($CHCl_3$) exhibits fewer than 5 visible specks when viewed in a light box. Particles visible to the naked eye are typically those greater than 40 micrometers in diameter. As used herein, the term "substantially free of particulate impurities greater than about 15 micrometers" means that of a forty gram sample of poly(arylene ether) dissolved in 400 milliliters of $CHCl_3$, the number of particulates per gram having a size of about 15 micrometers is less than 50, as measured by a Pacific Instruments ABS2 analyzer based on the average of five samples of twenty milliliter quantities of the dissolved poly(arylene ether) that is allowed to flow through the analyzer at a flow rate of one milliliter per minute (plus or minus five percent).

The composition can comprise the poly(arylene ether) in an amount of 30 to 60 weight percent (wt %), based on the combined weight of the poly(arylene ether), block copolymers and flame retardant. Within this range the amount of poly(arylene ether) can be greater than or equal to 33 wt %, or, more specifically, greater than or equal to 35 wt %. Also within this range the amount of poly(arylene ether) can be less than or equal to 55 wt %, or, more specifically, less than or equal to 50 wt %.

The first block copolymer is a copolymer comprising (A) at least one block comprising repeating aryl alkylene units and (B) at least one block comprising repeating alkylene units. The arrangement of blocks (A) and (B) can be a linear structure or a so-called radial teleblock structure having branched chains. The pendant aryl moiety can be polycyclic, have 6 to 10 cyclic carbons, and can have a substituent at any available position on the cyclic portion. Suitable substituents include alkyl groups having 1 to 4 carbons. An exemplary aryl alkylene unit is phenylethylene, which is shown in FIG. I:

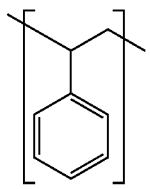

(I)

Block A can further comprise alkylene units having 2 to 15 carbons as long as the quantity of aryl alkylene units exceeds the quantity of alkylene units. Block B comprises repeating alkylene units having 2 to 15 carbons such as ethylene, propylene, butylene or combinations of two or more of the foregoing. Block B can further comprise aryl alkylene units as long as the quantity of alkylene units exceeds the quantity of aryl alkylene units. Each occurrence of block A can have a molecular weight which is the same or different than other occurrences of block A. Similarly each occurrence of block B can have a molecular weight which is the same or different than other occurrences of block B.

The repeating aryl alkylene units result from the polymerization of aryl alkylene monomers such as styrene. The repeating alkylene units result from the hydrogenation of repeating unsaturated units such as butadiene or isoprene. The butadiene can comprise 1,4-butadiene and/or 1,2-butadiene. The B block can further comprise some unsaturated carbon-carbon bonds.

Exemplary block copolymers include polyphenylethylene-poly(ethylene/propylene) which is sometimes referred to as polystyrene-poly(ethylene/propylene), polyphenylethylene-poly(ethylene/propylene)-polyphenylethylene (sometimes referred to as polystyrene-poly(ethylene/propylene)-polystyrene) and polyphenylethylene-poly(ethylene/butylene)-polyphenylethylene (sometimes referred to as polystyrene-poly(ethylene/butylene)-polystyrene).

In one embodiment, the first block copolymer has an aryl alkylene content less than or equal to 50 weight percent based on the total weight of the first block copolymer.

Exemplary block copolymers are commercially available from Asahi under the trademark TUFTEC and have grade names such as H1041, H1051, some grades available under the tradename SEPTON from Kuraray, block copolymers available under the trademark KRATON from Kraton Polymers and having grade names such as G-1701, G-1702, G-1730, G-1641, G-1650, G-1651, G-1652, and G-1657.

In some embodiments the first block copolymer has a number average molecular weight of 5,000 to 1,000,000 grams per mole (g/mol), as determined by gel permeation chromatography (GPC) using polystyrene standards. Within this range, the number average molecular weight can be at least 10,000 g/mol, or, more specifically, at least 30,000 g/mol, or, even more specifically, at least 45,000 g/mol. Also within this range, the number average molecular weight can preferably be up to 800,000 g/mol, or, more specifically, up to 700,000 g/mol, or, even more specifically, up to 650,000 g/mol.

The second block copolymer comprises (A) one or more blocks comprising repeating aryl alkylene units. The pendant aryl moiety can be polycyclic, have 6 to 10 cyclic carbons and can have a substituent at any available position on the cyclic portion. Suitable substituents include alkyl groups having 1 to 4 carbons. An exemplary aryl alkylene unit is phenylethylene, which is shown in Formula II:

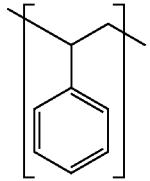

(II)

Block A can further comprise alkylene units having 2 to 15 carbons as long as the quantity of aryl alkylene units exceeds the quantity of alkylene units.

The second block copolymer further comprises (C) one or more blocks that is a controlled distribution copolymer block. A controlled distribution copolymer is a copolymer of aryl alkylene units and alkylene units having 2 to 15 carbons such as ethylene, propylene, butylene or combinations of two or more of the foregoing. The C block can comprise some unsaturated carbon-carbon bonds. "Controlled distribution copolymer block" refers to a molecular structure having the following attributes: (1) terminal regions adjacent to A blocks that are rich in (i.e., having a greater than an average amount of) alkylene units; (2) one or more regions not adjacent to the A blocks that are rich in (i.e., having a greater than average amount of) aryl alkylene units; and (3) an overall structure having relatively low aryl alkylene blockiness.

For the purposes hereof, "rich in" is defined as greater than the average amount, preferably at least 5% greater than the average amount.

Low blockiness can be shown by either the presence of only a single glass transition temperature (Tg) for the copolymer block, when analyzed using differential scanning calorimetry ("DSC") thermal methods or via mechanical methods, or shown by proton nuclear magnetic resonance ("H-NMR") methods.

The term "aryl alkylene blockiness", as measured by those skilled in the art using proton NMR (H-NMR), is defined to be the proportion of aryl alkylene units in the polymer having two nearest aryl alkylene neighbors on the polymer chain to the total number of aryl alkylene units. The aryl alkylene blockiness can be determined after using H-NMR to measure two experimental quantities. First, the total number of aryl alkylene units (i.e. arbitrary instrument units which cancel out when ratioed) is determined by integrating the total aryl alkylene aromatic signal in the H-NMR spectrum from 7.5 to 6.2 ppm and dividing this quantity by the number of aromatic hydrogens on each aromatic ring (5 in the case of styrene). Second, the blocky aryl alkylene units are determined by integrating that portion of the aromatic signal in the H-NMR spectrum from the signal minimum between 6.88 and 6.80 to 6.2 ppm and dividing this quantity by 2 to account for the 2 ortho hydrogens on each blocky aryl alkylene aromatic ring. The assignment of this signal to the two ortho hydrogens on the rings of the aryl alkylene units which have two aryl alkylene nearest neighbors was reported in F. A. Bovey, *High Resolution NMR of Macromolecules* (Academic Press, New York and London, 1972), chapter 6. The aryl alkylene blockiness is simply the percentage of blocky aryl alkylene units to total aryl alkylene units: Blocky %=100 times (blocky aryl alkylene units/total aryl alkylene units).

The potential for blockiness can also be inferred from measurement of the UV-visible absorbance at a wavelength range suitable for the detection of polyarlylalkyllithium end groups during the polymerization of the B block. A sharp and substantial increase in this value is indicative of a substantial increase in polyarlylalkyllithium chain ends. This will only occur if the conjugated diene concentration drops below the level necessary, typically a concentration of about 0.1% wt of diene, to maintain controlled distribution polymerization. Any aryl alkylene monomer that is present at this point will add in a blocky fashion.

In one embodiment the blocky % is less than or equal to 40. In one embodiment, the block copolymer has an aryl alkylene content often weight percent to forty weight percent, and the blocky % is less than or equal to 10 but greater than 0.

In one embodiment the block copolymer comprises an aryl alkylene/alkylene controlled distribution copolymer block, wherein the proportion of aryl alkylene units increases gradually to a maximum near the middle or center of the block and then decreases gradually until the opposite end of the polymer block is reached.

In one embodiment the first 15 to 25% and the last 15 to 85% of the block are alkylene rich, with the remainder considered to be aryl alkylene rich. The term "alkylene rich" means that the region has a measurably higher ratio of alkylene to aryl alkylene than the center region. For the controlled distribution or C block the weight percent of aryl alkylene in each C block is between about 10 weight percent and about 75 weight percent, preferably between about 25 weight percent and about 50 weight percent, based on the total weight of the controlled distribution copolymer block.

Anionic, solution copolymerization to form the controlled distribution copolymers can be carried out using known methods and materials. In general, the copolymerization is attained anionically, using known selections of adjunct materials, including polymerization initiators, solvents, promoters, and structure modifiers, but as a key feature, in the presence of a distribution agent. An exemplary distribution agent is a non-chelating ether. Examples of such ether compounds are cyclic ethers such as tetrahydrofuran and tetrahydropyrane and aliphatic monoethers such as diethyl ether and dibutyl ether. Production of block copolymers comprising a controlled distribution copolymer block is taught in U.S. Patent Application No. 2003/0176582.

One feature of the second block copolymer is that it can have two or more Tg's, the lower being the single Tg of the controlled distribution copolymer block. The controlled distribution copolymer block Tg is typically greater than or equal to −60° C., or, more specifically, greater than or equal to −40° C. The controlled distribution copolymer block Tg is typically less than or equal to +30° C., or, even more specifically, less than or equal to +10° C. The second Tg, that of the aryl alkylene block, is +80° C. to +110° C., or, more specifically, +80° C. to +105° C.

Each A block can have an average molecular weight of 3,000 to 60,000 g/mol and each C block can have an average molecular weight of 30,000 to 300,000 g/mol as determined by gel permeation chromatography using polystyrene standards. The total amount of aryl alkylene units is 15 to 75 weight percent, based on the total weight of the block copolymer. The weight ratio of alkylene units to aryl alkylene units in the C block can be 5:1 to 1:2. Exemplary block copolymers are further disclosed in U.S. Patent Application No. 2003/181584 and 2003/0176582 and are commercially available from Kraton Polymers under the trademark KRATON. Exemplary grades are A-RP6936 and A-RP6935.

In one embodiment, the first and/or second block copolymer can be functionalized in a number of ways. One way is by treatment with an unsaturated monomer having one or more functional groups or their derivatives, such as carboxylic acid groups and their salts, anhydrides, esters, imide groups, amide groups, and acid chlorides. Exemplary monomers include maleic anhydride, maleic acid, fumaric acid, and their derivatives. A further description of functionalizing such block copolymers can be found in U.S. Pat. No. 4,578,429 and in U.S. Pat. No. 5,506,299. In another manner, the first and/or second block copolymer can be functionalized by grafting silicon or boron containing compounds to the polymer as taught in U.S. Pat. No. 4,882,384. In still another manner, the first and/or second block copolymer can be contacted with an alkoxy-silane compound to form a silane-modified block copolymer. In yet another manner, the first and/or second block copolymer can be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the first and/or second block copolymer can be metallated as taught in U.S. Pat. Nos. 5,206,300 and 5,276,101, wherein the polymer is contacted with an alkali metal alkyl, such as a lithium alkyl. And still further, the first and/or second block copolymer can be functionalized by grafting sulfonic groups to the polymer as taught in U.S. Pat. No. 5,516,831.

The combination of block copolymers can be present in the composition in an amount of 20 to 60 weight percent, based on the combined weight of the poly(arylene ether), block copolymers and flame retardant. Within this range the combination of block copolymers can be present in an amount greater than or equal to 25, or, more specifically, greater than or equal to 30 weight percent based on the combined weight of the poly(arylene ether), block copolymers, and flame retardant. Also within this range the combination of block copolymers can be present in an amount less than or equal to 57, or, more specifically, less than or equal to 55 weight percent based on the combined weight of the poly(arylene ether), block copolymers, and flame retardant. The weight ratio of the first block copolymer to the second block copolymer can be 0.25 to 4.0.

The thermoplastic composition further comprises a flame retardant. There is no particular restriction on the type of flame retardant that can be used except that the flame retardant is suitably stable at the elevated temperatures employed during processing and free of chlorine, bromine and fluorine. Suitable flame retardants include organic phosphates, phosphinates, magnesium oxide, zinc borate, melamine polyphosphate, magnesium hydroxide, aluminum hydroxide, and combinations comprising two or more of the foregoing.

Exemplary organic phosphates include, but are not limited to, phosphates containing substituted phenyl groups, phosphates based upon resorcinol such as, for example, resorcinol bis-diphenylphosphate, as well as those based upon bis-phenols such as, for example, bis-phenol A bis-diphenylphosphate. In one embodiment, the organic phosphate is selected from tris(alkylphenyl) phosphate (for example, CAS No. 89492-23-9 and/or 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris (isopropylphenyl) phosphate (for example, CAS No. CAS No. 68937-41-7) and mixtures of two or more of the foregoing.

Flame retardants are employed in amounts sufficient to provide the desired level of flame retardance. As flame retardance standards vary according to application in which the composition is used the amount of flame retardant or combination of flame retardants also varies. Additionally the amount of flame retardance varies depending on the identity of the flame retardant. However, since the use of these flame retardants are well known determination of the amount of flame retardant is well within the skill of one of ordinary skill in the art without undue experimentation.

In one embodiment, the flame retardant comprises resorcinol bis-diphenylphosphate. When the flame retardant comprises resorcinol bis-diphenylphosphate, the flame retardant is present in an amount of 10 to 30 wt %, based on the combined weight of the poly(arylene ether), block copolymers, and flame retardant. Within this range the flame retardant can be present in an amount less than or equal to 25 wt %, or more specifically, less than or equal to 20 wt %, based on the combined weight of the poly(arylene ether), block copolymers, and flame retardant.

Additionally, the composition can optionally also contain various additives, such as antioxidants; fillers and reinforcing agents having an average particle size less than or equal to 10 micrometers, such as, for example, silicates, $TiO_2$, fibers, glass fibers, glass spheres, carbon black, graphite, calcium carbonate, talc, and mica; mold release agents; UV absorbers; stabilizers such as light stabilizers and others; lubricants; plasticizers; pigments; dyes; colorants; anti-oxidants, mineral oil, anti-static agents; blowing agents and combinations comprising one or more of the foregoing additives.

The components for the flexible composition can be combined under suitable conditions for the formation of an intimate blend, typically in a high shear mixing device such as an extruder or Banbury mixer. In one embodiment, the poly (arylene ether) and block copolymers are compounded to form a first mixture and then fire retardant is compounded with the first mixture. In another embodiment the poly (arylene ether), block copolymers and fire retardant are added at the same time to a high shear mixing device.

The composition can be applied directly onto the surface of the conductive core by a suitable method such as extrusion coating to form a coated wire. The composition can also be applied to an insulating layer previously formed on a conductive core or onto the surface of a predetermined number of wires or cables (which can be coated or uncoated) to give a sheath layer that covers a multi wire cable. The thickness of the composition can vary and is typically determined by the end use of the coated wire or cable. In one embodiment the coating has a thickness of 0.03 mm to 0.3 mm.

In some embodiments it can be useful to dry the composition before extrusion coating the wire. Exemplary drying conditions are 70-85° C. for 2-5 hours. Additionally, the thermoplastic composition can be filtered prior to applying it to the conductive wire, typically through a filter having a mesh size of 30-300. A color concentrate or masterbatch can be added to the composition prior to extrusion coating. When a color concentrate is used it is typically present in an amount less than or equal to 5 weight percent, based on the total weight of the composition. As appreciated by one of skill in the art, the color of the composition prior to the addition of color concentrate can impact the final color achieved and in some cases it can be advantageous to employ a bleaching agent and/or color stabilization agents. Bleaching agents and color stabilization agents are known in the art and are commercially available.

The processing temperature during extrusion coating is generally less than or equal to 320° C., or, more specifically, less than or equal to 300° C., or, more specifically, less than or equal to 280° C. The processing temperature is greater than or equal to 200° C. Additionally the processing temperature is greater than or equal to the softening temperature of the poly(arylene ether).

After extrusion coating the coated wire can be cooled using a water bath, water spray, air jets or a combination comprising one or more of the foregoing cooling methods. Exemplary water bath temperatures are 5 to 60° C. After cooling the coated wire is wound onto a spool or like device, typically at a speed of 50 meters per minute (m/min) to 1000 m/min.

In one embodiment, the thermoplastic composition is substantially free of visible particulate impurities. In another embodiment, the composition is substantially free of particulate impurities greater than about 15 micrometers. As used herein, the term "substantially free of visible particulate impurities" means that when the composition is injection molded to form 5 plaques having dimensions of 75 mm×50 mm and having a thickness of 3 mm and the plaques are visually inspected for black specks with the naked eye the total number of black specks for all five plaques is less than or equal to 100, or, more specifically, less than or equal to 70, or, even more specifically, less than or equal to 50.

Suitable electrically conductive cores include, but are not limited to, copper wire, aluminum wire, lead wire, and wires of alloys comprising one or more of the foregoing metals. An optional adhesion promoting layer can be disposed between the conductive core and flexible composition. As defined herein, an electrically conductive core can be a single wire or a plurality of wires. In some cases, a plurality of wires can be bundled and twisted or braided, similar to yarn or rope. Alternatively the composition can be molded or extruded to form articles such as sheets or trays when it is desirable for such articles to have combination of chemical resistance, heat aging, abrasion resistance and impact strength.

The composition and coated wire are further illustrated by the following non-limiting examples.

EXAMPLES

The following examples were prepared using the materials listed in Table 1.

Compositions were made according to the formulations shown in Table 2. The compositions were made by combining the PPE, KG 1651 and Kraton A in the feedthroat of the extruder and the RDP was added to the extruder downstream of the feedthroat using a liquid injector. The resulting compositions were injection molded into the appropriate size test bars for testing for Shore D, tensile strength, tensile elongation, flexural modulus, and heat deformation temperature. Shore D testing was conducted according to ASTM D2240, tensile strength and tensile elongation were conducted according to the modified ASTM D638 described above, heat deformation was conducted according to ASTM D648 at 4.6 kg/cm². Results are shown in Table 2.

The compositions shown in Table 2 were also extrusion coated onto a 0.16 mm×7 lines stranded copper wire to form a coating have a thickness of 0.3 mm for a total diameter of 1 millimeter. The coated wire or coating alone, as indicated by the test method, was tested for ultimate tensile strength, tensile elongation, and flame retardance performance according to UL 1581. Heat deformation was determined according to UL1581. Results are shown in Table 2.

TABLE 2

|  | 1 | 2 | 3 | 4 | 5 | 6* | 7* | 8* | 9* | 10* | 11* |
| --- | --- | --- | --- | --- | --- | --- | --- | --- | --- | --- | --- |
| PPE | 40 | 40 | 40 | 45 | 35 | 20 | 70 | 45 | 40 | 40 | 40 |
| KG 1651 | 20 | 15 | 30 | 20 | 25 | 35 | 5 | 20 | 47 | — | 5 |
| Kraton A | 27 | 32 | 17 | 22 | 27 | 32 | 12 | 27 | — | 47 | 42 |
| RDP | 13 | 13 | 13 | 13 | 13 | 13 | 13 | 8 | 13 | 13 | 13 |
| ASTM Methods |  |  |  |  |  |  |  |  |  |  |  |
| Shore D | 56 | 54 | 59 | 61 | 51 | 38 | 95 | 59 | 69 | 52 | 53 |
| Tensile strength (Mpa) | 22 | 21 | 24 | 25 | 21 | 16 | 57 | 25 | 23 | 18 | 19 |
| Tensile elongation (%) | 210 | 238 | 212 | 205 | 233 | 325 | 85 | 224 | 205 | 240 | 215 |
| Flexural Modulus (Mpa) | 687 | 608 | 751 | 843 | 598 | 198 | 1850 | 748 | 925 | 608 | 686 |
| HDT (° C.) | 86 | 85 | 87 | 90 | 80 | 51 | 117 | 91 | 87 | 80 | 84 |
| UL 1581 Methods |  |  |  |  |  |  |  |  |  |  |  |
| Tensile strength (Mpa) | 35 | 34 | 37 | 36 | 31 | 19 | 41 | 36 | 38 | 24 | 24 |
| Ultimate elongation (%) | 249 | 269 | 225 | 230 | 315 | 510 | 15 | 278 | 233 | 309 | 275 |
| HD at 121° C., 250 grams (%) | 35 | 40 | 31 | 29 | 47 | 99 | 5 | 30 | 26 | 77 | 69 |
| Flame retardance - VW-1 | P | P | P | P | P | NP | P | NP | P | NP | NP |

*Comparative example

P = Pass;

NP = No pass

TABLE 1

| Component | Description |
| --- | --- |
| PPE | A poly(2,6-dimethylphenylene ether) having an intrinsic viscosity of 0.46 dl/g as measured in chloroform at 25° C. and commercially available from General Electric. |
| KG1651 | A polyphenylethylene-poly(ethylene/butylene)-polyphenylethylene block copolymer having a phenylethylene content of 32 weight percent, based on the total weight of the block copolymer and commercially available from Kraton Polymers. |
| Kraton A | A styrene-(ethylene/propylene-styrene)-styrene copolymer commercially available from Kraton Polymers under the grade name RP6936 having a styrene content of 39 weight percent, based on the total weight of the block copolymer. |
| RDP | Resorcinol bis-diphenylphosphate (CAS No. 57583-54-7) |

As can be seen by the foregoing examples the combination of poly(arylene ether), two block copolymers and flame retardant are necessary to yield a flexible composition with a combination of flame retardancy, heat stability, Shore D, and tensile elongation. Example 6, in which a portion of the poly(arylene ether) has been replaced with an increased amount of block copolymers, has an unacceptably high heat deformation as well as unacceptable flame retardance. In contrast, Example 7, in which a portion of the block copolymers has been replaced with poly(arylene ether), has an unacceptably high Shore D value as well as low elongation values. Example 8, which has a low quantity of organic phosphate, has insufficient flame retardance. Example 9 demonstrates the need for a block copolymer wherein at least one block comprises a controlled distribution copolymer because without such a block copolymer the composition has an unacceptably high Shore D hardness. Examples 10 and 11 both demonstrate the importance of the combination of block copolymers, particularly with regard to heat stability and flame retardance.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A flexible thermoplastic composition consisting essentially of
a poly(arylene ether),
a first block copolymer,
a second block copolymer and
a flame retardant
wherein the second block copolymer comprises a block that is a controlled distribution copolymer having terminal regions that are rich in alkylene units and a center region that is rich in aryl alkylene units and
the first block copolymer is selected from the group consisting of polyphenylethylene-poly(ethylene/propylene), polyphenylethylene-poly(ethylene/propylene)-polyphenylethylene, and polyphenylethylene-poly(ethylene/butylene)-polyphenylethylene, and
wherein the poly(arylene ether) is present in an amount of 30 to 60 weight percent and the combination of the first block copolymer and second block copolymer are present in an amount of 20 to 60 weight percent, based on the combined weight of the poly(arylene ether), block copolymers, and flame retardant
wherein the composition has an ultimate elongation greater than or equal to 100% and less than or equal to 500% according to UL 1581.

2. The composition of claim 1 wherein the composition has a tensile strength greater than or equal to 10 Megapascals according to UL 1581.

3. The composition of claim 1 wherein the composition has a flame retardance of V-1 or better according to UL 94 at a thickness of 6.4 millimeters.

4. The composition of claim 1 wherein the composition has a tensile strength greater than or equal to 10 Megapascals and a tensile elongation greater than or equal to 100% and less than or equal to 500% as determined according to a modified ASTM D638 method.

5. The composition of claim 1 wherein the composition has a heat distortion temperature (HDT) greater than or equal to 70° C., at 4.6 kilograms per square centimeter ($kg/cm^2$) grams as determined according to ASTM D648.

6. The composition of claim 1 wherein the composition has a Shore D value of 40 to 70 as determined according to ASTM D2240.

7. The composition of claim 1 wherein the composition is essentially free of chlorine, bromine and fluorine.

8. The composition of claim 1 wherein the composition has a flexural modulus of 350 to 1000 Megapascals as determined by ASTM D790.

9. The composition of claim 1 wherein the poly(arylene ether) has an initial intrinsic viscosity greater than 0.3 deciliters per gram (dl/g), as measured in chloroform at 25° C.

10. The composition of claim 1 wherein the poly(arylene ether) has a hydroxy end group content of less than or equal to 6300 parts per million based on the total weight of the poly(arylene ether) as determined by Fourier Transform Infrared Spectrometry.

11. The composition of claim 1 wherein the poly(arylene ether) is substantially free of visible particulate impurities.

12. The composition of claim 1 wherein the first block copolymer has an aryl alkylene content less than or equal to 50 weight percent based on the total weight of the first block copolymer.

13. The composition of claim 1 wherein the second block copolymer comprises (A) at least one block comprising repeating aryl alkylene units and (C) one or more blocks that is a controlled distribution copolymer block of aryl alkylene units and alkylene units having 2 to 15 carbons.

14. The composition of claim 1 wherein the second block copolymer has at least two glass transition temperatures.

15. The composition of claim 1 wherein the ratio of the first block copolymer to the second block copolymer is 0.25 to 4.0.

16. The composition of claim 1 further comprising an antioxidant; filler or reinforcing agent having an average particle size less than or equal to 10 micrometers; mold release agent; UV absorber; light stabilizer; lubricant; plasticizer; pigment; dye; colorant; anti-oxidant, mineral oil, anti-static agent; blowing agent or a combination comprising one or more of the foregoing additives.

17. The composition of claim 1 wherein the composition has a heat deformation less than or equal to 50% at 121° C. with a weight of 250 grams as determined by UL 62.

18. A coated wire comprising an electrically conductive core at least partially covered by a flexible thermoplastic composition consisting essentially of
a poly(arylene ether),
a first block copolymer,
a second block copolymer and
a flame retardant
wherein the second block copolymer comprises a block that is a controlled distribution copolymer having terminal regions that are rich in alkylene units and a center region that is rich in aryl alkylene units
wherein the composition has an ultimate elongation greater than or equal to 100% and less than or equal to 500% according to UL 1581.

19. The coated wire of claim 18 wherein the composition has a tensile strength greater than or equal to 10 Megapascals according to UL 1581.

20. The coated wire of claim 18 wherein the coated wire meets or exceeds the VW-1 flame test according to UL 1581.

21. The coated wire of claim 18 wherein the composition has a heat deformation less than or equal to 50% at 121° C. with a weight of 250 grams as determined by UL 62.

22. The coated wire of claim 18 wherein the poly(arylene ether) is present in an amount of 30 to 60 weight percent and the combination of the first block copolymer and second block copolymer are present in an amount of 20 to 60 weight percent, based on the combined weight of the poly(arylene ether), block copolymers, and flame retardant.

23. The coated wire of claim 18 wherein the composition is essentially free of chlorine, bromine and fluorine.

24. The coated wire of claim 18 wherein the second block copolymer has at least two glass transition temperatures.

25. The coated wire of claim 18 wherein the electrically conductive core comprises copper wire, aluminum wire, lead wire, wire of an alloy comprising one or more of the foregoing metals or a combination of the foregoing wires.

26. A coated wire comprising an electrically conductive core at least partially covered by a flexible thermoplastic composition comprising:
a poly(arylene ether);
a first block copolymer selected from the group consisting of polyphenylethylene-poly(ethylene/propylene), polyphenylethylene-poly(ethylene/propylene)-polyphenylethylene, and polyphenylethylene-poly(ethylene/butylene)-polyphenylethylene;
a second block copolymer; and
a flame retardant,
wherein the second block copolymer comprises a block that is a controlled distribution copolymer having terminal regions that are rich in alkylene units and a center region that is rich in aryl alkylene units,
wherein the poly(arylene ether) is present in an amount of 30 to 60 weight percent and the combination of the first block copolymer and second block copolymer are present in an amount of 20 to 60 weight percent, based on the combined weight of the poly(arylene ether), block copolymers, and flame retardant,
wherein the weight ratio of the first block copolymer to the second block copolymer is 0.25 to 4.0, and
wherein the composition has an ultimate elongation greater than or equal to 100% and less than or equal to 500% according to UL 1581.

27. The coated wire of claim 26, wherein the combination of the first block copolymer and second block copolymer are present in an amount of 25 to 60 weight percent, based on the combined weight of the poly(arylene ether), block copolymers, and flame retardant.

28. A flexible thermoplastic composition comprising:
a poly(arylene ether);
a first block copolymer selected from the group consisting of polyphenylethylene-poly(ethylene/propylene), polyphenylethylene-poly(ethylene/propylene)-polyphenylethylene, and polyphenylethylene-poly(ethylene/butylene)-polyphenylethylene;
a second block copolymer; and
a flame retardant,
wherein the second block copolymer comprises a block that is a controlled distribution copolymer having terminal regions that are rich in alkylene units and a center region that is rich in aryl alkylene units,
wherein the poly(arylene ether) is present in an amount of 30 to 60 weight percent and the combination of the first block copolymer and second block copolymer are present in an amount of 20 to 60 weight percent, based on the combined weight of the poly(arylene ether), block copolymers, and flame retardant,
wherein the weight ratio of the first block copolymer to the second block copolymer is 0.25 to 4.0, and
wherein the composition has an ultimate elongation greater than or equal to 100% and less than or equal to 500% according to UL 1581.

29. The composition of claim 28, wherein the combination of the first block copolymer and second block copolymer are present in an amount of 25 to 60 weight percent, based on the combined weight of the poly(arylene ether), block copolymers, and flame retardant.

30. The composition of claim 28 wherein the composition has a tensile strength greater than or equal to 10 Megapascals according to UL 1581.

31. The composition of claim 28 wherein the composition has a flame retardance of V-1 or better according to UL 94 at a thickness of 6.4 millimeters.

32. The composition of claim 28 wherein the composition has a tensile strength greater than or equal to 10 Megapascals and a tensile elongation greater than or equal to 100% and less than or equal to 500% as determined according to a modified ASTM D638 method.

33. The composition of claim 28 wherein the composition has a heat distortion temperature (HDT) greater than or equal to 70° C., at 4.6 kilograms per square centimeter ($kg/cm^2$) grams as determined according to ASTM D648.

34. The composition of claim 28 wherein the composition has a Shore D value of 40 to 70 as determined according to ASTM D2240.

35. The composition of claim 28 wherein the composition is essentially free of chlorine, bromine and fluorine.

36. The composition of claim 28 wherein the composition has a flexural modulus of 350 to 1000 Megapascals as determined by ASTM D790.

37. The composition of claim 28 wherein the poly(arylene ether) has an initial intrinsic viscosity greater than 0.3 deciliters per gram (dl/g), as measured in chloroform at 25° C.

38. The composition of claim 28 wherein the poly(arylene ether) has a hydroxy end group content of less than or equal to 6300 parts per million based on the total weight of the poly(arylene ether) as determined by Fourier Transform Infrared Spectrometry.

39. The composition of claim 28 wherein the poly(arylene ether) is substantially free of visible particulate impurities.

40. The composition of claim 28 wherein the first block copolymer has an aryl alkylene content less than or equal to 50 weight percent based on the total weight of the first block copolymer.

41. The composition of claim 28 wherein the second block copolymer comprises (A) at least one block comprising repeating aryl alkylene units and (C) one or more blocks that is a controlled distribution copolymer block of aryl alkylene units and alkylene units having 2 to 15 carbons.

42. The composition of claim 28 wherein the second block copolymer has at least two glass transition temperatures.

43. The composition of claim 28 further comprising an antioxidant; filler or reinforcing agent having an average particle size less than or equal to 10 micrometers; mold release agent; UV absorber; light stabilizer; lubricant; plasticizer, pigment; dye; colorant; anti-oxidant, mineral oil, anti-static agent; blowing agent or a combination comprising one or more of the foregoing additives.

44. The coated wire of claim 26 wherein the composition has a tensile strength greater than or equal to 10 Megapascals according to UL 1581.

45. The coated wire of claim 26 wherein the coated wire meets or exceeds the VW-1 flame test according to UL 1581.

46. The coated wire of claim 26 wherein the composition has a heat deformation less than or equal to 50% at 121° C. with a weight of 250 grams as determined by UL 62.

47. The coated wire of claim 26 wherein the poly(arylene ether) is present in an amount of 30 to 60 weight percent and the combination of the first block copolymer and second block copolymer are present in an amount of 20 to 60 weight percent, based on the combined weight of the poly(arylene ether), block copolymers, and flame retardant.

48. The coated wire of claim 26 wherein the composition is essentially free of chlorine, bromine and fluorine.

49. The coated wire of claim 26 wherein the second block copolymer has at least two glass transition temperatures.

50. The coated wire of claim 26 wherein the electrically conductive core comprises copper wire, aluminum wire, lead wire, wire of an alloy comprising one or more of the foregoing metals or a combination of the foregoing wires.

* * * * *